United States Patent [19]

Vegeais et al.

[11] Patent Number: 4,555,715

[45] Date of Patent: Nov. 26, 1985

[54] THERMAL PRINTHEAD MOUNTING CONTROL

[75] Inventors: Patrick Vegeais, St Germain en Laye; Michel Brot, Argenteuil; Jean-Yves Valet, Beauchamp, all of France

[73] Assignee: Societe d'Applications Generales d'Electricite et de Mecaniques Sagem

[21] Appl. No.: 627,985

[22] Filed: Jul. 5, 1984

[30] Foreign Application Priority Data

Jul. 8, 1983 [FR] France ................................ 83 11448

[51] Int. Cl.$^4$ .......................... G01D 15/10; B41J 3/20

[52] U.S. Cl. ................................ 346/76 PH; 400/120

[58] Field of Search .................... 346/76 PH; 400/120

[56] References Cited

U.S. PATENT DOCUMENTS 4,315,135 2/1982 Tokugawa et al. ............ 219/216 X 4,390,884 6/1983 Applegate et al. ......... 346/139 C X

FOREIGN PATENT DOCUMENTS 2451825 11/1980 France .......................... 346/76 PH 1473868 5/1977 United Kingdom ................ 400/120

*Primary Examiner*—E. A. Goldberg

*Assistant Examiner*—Gerald E. Preston

*Attorney, Agent, or Firm*—Larson and Taylor

[57] ABSTRACT

Writing device with heating elements for printing by thermal action on a writing support, mounted on a base and comprising a heating elements support bearing the heating elements and first electrical contacts connected directly to said heating elements, an intermediate support to support mechanically and removably the support, a connecting part provided with second electrical contacts adapted to cooperate with the first contacts of the support and attached respectively to the base. A fixing device fasten the support and the part to the base so as to permit, between the heating elements support and the base, the relative movements necessary for the progress of the writing process. A device for positioning of the heating elements support on the intermediate support, and locking device to make fast mechanically and removably the heating elements support to the intermediate support are also included.

12 Claims, 4 Drawing Figures

THERMAL PRINTHEAD MOUNTING CONTROL

BACKGROUND OF THE INVENTION

The present invention relates to a writing device with heating elements for printing by thermal action on a writing support, this device being fixed to a base such as a printing machine carriage.

It is essentially an object of the invention to provide a writing device with heating elements in which the heating elements or preferably their support, subject to mechanical wear by reason of its contact with the writing support, is designed in the form of an independant and removable member, easily replaceable without particular tooling by an unspecialized operator, and such a writing device must in addition be easily and rapidly produceable and mountable at less cost.

GENERAL DESCRIPTION OF THE INVENTION

Accordingly, the writing device according to the invention is characterized in that it comprises:

a support for heating elements bearing, on the one hand, the heating elements arranged in the form of electrical resistances and, on the other hand, first electrical contacts connected to said heating elements, an intermediate support to support mechanically the heating elements support removably, a connecting part provided with second electrical contacts arranged to cooperate with the abovesaid first electrical contacts of the support of the heating elements and attached respectively to the base, fastening means to fix the intermediate support and the connecting part to the base so as to enable, between the heating elements support and the base, the necessary relative movements for the progress of the writing process, positioning means for the support of the heating elements on the intermediate support arranged so that the heating elements occupy, in operational position, a predetermined position with respect to the writing support and that the first and second electrical contact respectively of the support of the heating elements and of the connecting part cooperate mutually, and locking means to make fast mechanically and removably the heating elements support to the intermediate support.

Preferably the heating elements support comprises a base plate and a strip provided with said heating elements and made fast to the base plate in the vicinity of a first edge of the latter.

In this case, it is possible to arrange for the heating elements to be constituted in the form of printed circuit elements on the strip, for the abovesaid first electrical contacts and the connections between the latter and the heating elements to be printed circuits on a flexible tape, and for said tape to be fixed to the base plate to extend between said strip and a second edge of the plate opposite said first edge.

Advantageously, the strip is constituted of a ceramic material, which material is electrically and thermally insulating.

In an advantageous embodiment, the fastening means comprise a fixed rotary axle borne by the base and on which the intermediate support and the connecting part are hinged, control means being inserted between the base and the intermediate support to position the latter angularly in a manner suitable for the progress of the printing process.

In this case, the support can be constituted in the form of a panel equipped with abovesaid positioning means and locking means. The positioning means can then comprise, on the one hand, a slot provided in the connecting part and adapted to receive the abovesaid second edge of the base plate and, on the other hand, at least two fingers projecting on the panel and at least two corresponding holes formed in the base plate. In addition, the positioning means can comprise also at least one positioning bearing provided on the panel, against which the base plate is held supported under the action of the locking means.

Advantageously, in an arrangement of this type, it is possible to arrange so that the connecting part presents, in transverse section, a substantially U shape, and that the second electrical contacts be constituted in the form of printed circuits on at least one second flexible tape whose end is engaged inside the U. Under these conditions, it is possible for at least one elastically deformable gripping member to be interposed between the cooperating surfaces of the base plate and of the connecting part, respectively. Advantageously, this elastic member is borne by the inner surface of one arm of the U formed by the connecting part and this elastic member is interposed between the arm of the U and the second flexible tape.

In a particular embodiment, it is possible to provide, in combination with the last-mentioned arrangements, for the second electrical contacts to be printed on two flexible tapes supported respectively by the two arms of the U formed by the connecting part, and for the first flexible tape fastened to the base plate to be wound around the second edge of the latter so as to be situated facing the two second flexible tapes in the position of mounting the base plate in the connecting part.

To obtain a more compact assembly, it is possible also to arrange for the bottom of the connecting part to be recessed in the central axial zone of this part, and for the one or more second flexible tapes to be engaged through this recess.

In order that the part supporting the heating elements, which is maintained supported against the writing support in the course of the writing process and which is hence subjected to wear, may be easily disengaged or put in place without particular tooling, the locking means comprise at least one permanent magnet system interposed between the heating elements support and the intermediate support.

Finally, the control means of the angular position of the intermediate support comprise means with an eccentric element drivable in rotation and borne by the base, and a connecting rod coupling these eccentric means to the intermediate support, particularly to the panel.

By means of the features which have just been mentioned, considered alone or in combination, it is possible to construct a thermal writing device constituted in the form of an assembly of moveable, removeable and easily replaceable parts, particularly as regards the heating element support and subject to more rapid wear; in addition, the maintenance in position of the different components is obtained by simple fitting which permit the maintenance operations to be carried out simply and rapidly by unqualified personnel, without particular tooling. Finally, the positioning and locking means are judiciously arranged so that, by this simple mutual fitting of the components parts, they are ensured of suitable positioning and in particular the correct positioning of the heating elements with respect to the roller serving as an anvil for the writing support.

BRIEF DESCRIPTION OF THE DRAWINGS

The invention will be better understood on reading the detailed description which follows of a preferred embodiment given purely by way of non-limiting example. In this description, reference is made to the accompanying drawings in which.

DESCRIPTION OF A PREFERRED EMBODIMENT

Figure 1:
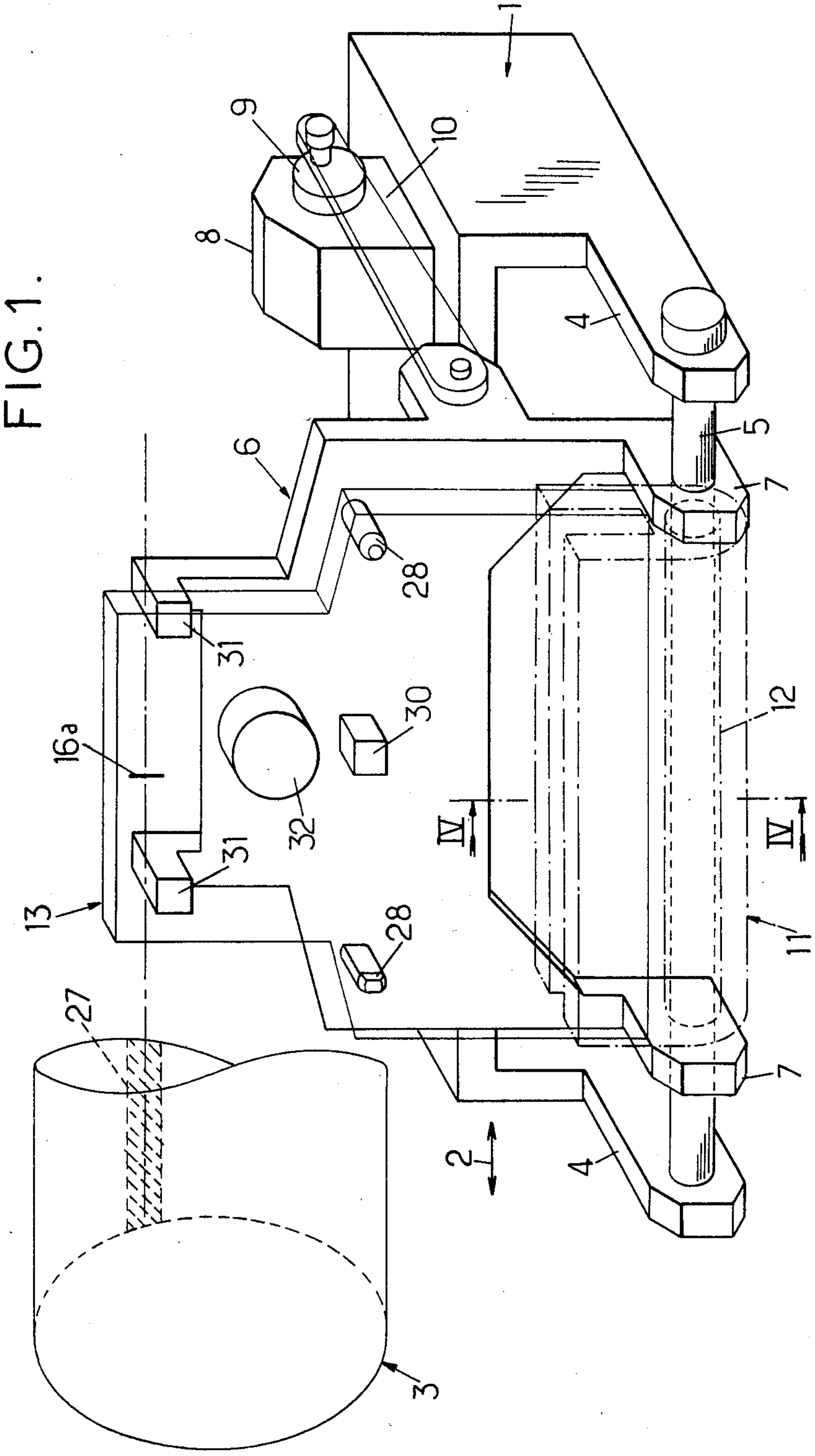
FIG. 1 is a diagrammatic off-centered perspective view of a writing device by thermal action arranged according to the invention and shown in operating position, certain component elements not being shown for better clarity.

Referring first to FIG. 1, the reference 1 denotes generally a printing machine carriage which is moveable in a direction (double arrow 2) parallel to a roller 3 (shown in spectral line) for the support and driving of the printing support (not shown); the roller 3 is only partially shown for greater clarity. Conventionally, the carriage 1 may be supported and guided by slideways and driven by motor means, these being elements known to the man skilled in the art are therefore not being shown.

In its front portion (that is to say turned towards the roller 3) and for example its lower part, the carriage possesses two horizontal projecting arms 4 supporting a fixed axle 5.

On the axle 5, and between the arms 4, is rotatably mounted a panel 6 extending substantially verticaly. Preferably, the panel 6 is mounted on the axle 5 by two horizontal projecting arms 7 so that the panel extends behind the axle 5.

An electric motor 8, mounted on the carriage 1, drives an eccentric element 9 coupled in rotation to one end of a connecting rod 10 (shown in spectral line) whose other end is coupled in rotation to the panel 6.

A part 11 (shown in mixed line in FIG. 1), called a connecting part for a reason which will appear below, possessing (in transverse section) the general shape of a U is mounted at its lower part, on the axle 5 between the arms 7 of the panel 6. Preferably, the housing 12 provided in the connecting part 11 for the passage of the axle 5 possesses a diameter slightly greater than that of the axle 5 to permit a slight transverse play of the connecting part 11 with respect to the axle 5.

Finally, a heating element support 13 (shown diagrammatically in spectral line in FIG. 1 and represented in full and detailed manner in FIGS. 2 and 3) comprises a base plate 14 and a small plate or strip 15 provided with heating writing elements 16 arranged in a column 16a (in FIG. 1, the column 16a has been shown diagrammatically in the form of a line).

Strip 15, preferably constituted of an electrically and thermally insulating ceramic material and which possesses good mechanical stability to avoid deformation, is fixed to the base plate 14 in the vicinity of one of the edges of the latter. The column of heating elements 16 extends along the axis of symmetry of the strip, and the heating element 16 as well as the supply connection 17 and the ground connections 18 are constructed in the form of printed circuits on the strip 15.

Figure 2:
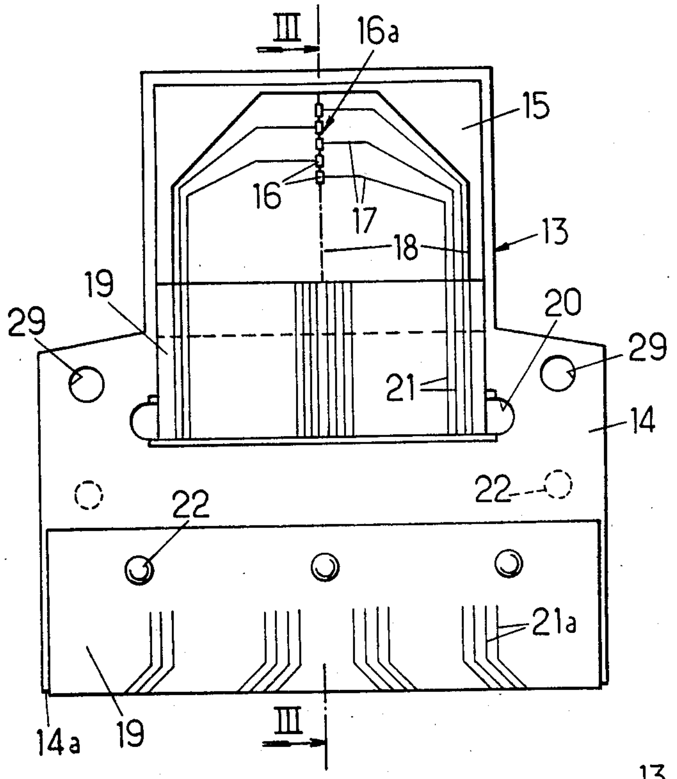
FIG. 2 is a front view of an element of the device of FIG. 1.
Figure 3:
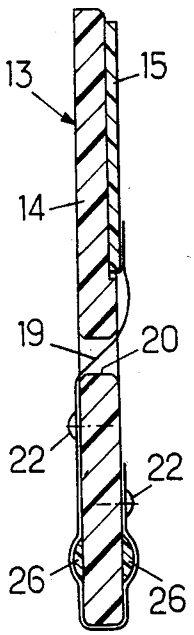
FIG. 3 is a sectional view along the line III—III of FIG. 2.

The base plate 14 can be conformed, as shown in FIGS. 1 and 2, with a zone (upper in the Figures) which is narrowed, mating, for example, approximately the contour of the strip 15 and with a zone (lower in the Figures) which is wider, corresponding, for example, approximately to the width of the connecting part 11.

A flexible tape 19, constituted for example of Mylar or of a similar electrically insulating material, extends from the strip 15 to the opposite edge 14a of the base plate 14 around which it is wound, after having traversed the base plate 14 through an elongated aperture 20. The tape 19 bears conducting connections 21 in the form of printed circuits which, taking into account the mounting adopted, only needs to be positioned on a single surface of the flexible tape 19, which surface is in contact with the strip 15 at one end and is turned outwards around the edge 14a at its other end.

The tape 19 is fixed to the base plate 14 for example by means of rivets 22 and its printed conductors 21 are connected, for example by welding, to the conductors 17, 18 printed on the strip 15.

Thus arranged, the support 13 of heating elements is constituted in the form of a removeable component which can easily be connected to a complementary connection element by simple insertion due to the presence of printed conductors forming contacts 21a respectively on the two main surfaces of the part 14.

Figure 4:
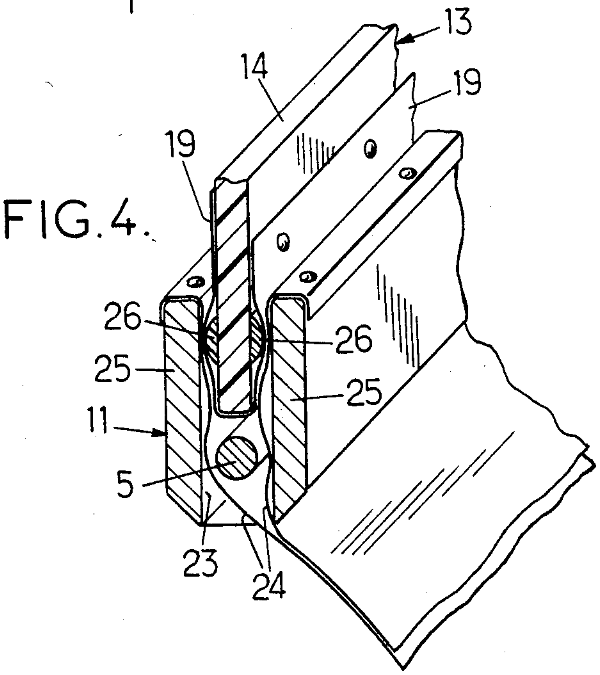
FIG. 4 is a partial view in cross-section and in overhead perspective of the element of FIGS. 2 and 3 located in its operating position shown in FIG. 1, the section being made along the line IV—IV of FIG. 1.

The complementary connection element concerned is no other than the connecting part 11 already mentioned, equipped as shown in FIG. 4. The bottom of the U-shaped part is recessed in its central region so as to present a lower aperture 23 and the U-shaped part only rests on the axle 5 by its ends. Two flexible tapes 24, bearing electrical connections constituted in the form of printed circuits and being constitutable identically to the flexible tape 19, are engaged through the aperture 23, on each side of the axle 5, to run along the inner facing walls of the arms 25 of the part 11. The ends of tapes 24 are folded back on the ends of the arms 25 and fixed to the latter.

Of course, the electrical connections are printed on the facing surfaces of the turned tapes 24 and, in the vicinity of the ends of the tapes, these connections are arranged, particularly as regards their width and their spacing, to be positioned facing connections printed on the tape 19 when the support 13 is introduced into the U-shaped part 11 as shown in FIG. 4. To ensure a good electrical contact between the connections of the tapes 24 and the tape 19, it is desirable for the tapes to be pressed against one another by means of the presence of projecting elastic beadings 26, for example borne by the two surfaces of the plate 14, and hence covered by the tape 19. Of course, these beadings could also be supported by the arms 25.

At the other end, the tapes 24 are attached to the carriage (not shown) from where the connection is ensured through a flexible flat cable with control means arranged in fixed manner in the printing machine, in a manner known in itself.

Besides being supported by the connecting part 11 as shown in FIG. 4, the heating elements support 13 is also made fast to the panel 6 so as to ensure its mechanical fastening to the carriage and its positioning in a predetermined position so that the column 16*a* of heating elements is situated opposite the closest generator of the roller 3 (writing zone represented at 27 on the roller 3 in FIG. 1).

To these ends, the panel 6 is provided with two projecting positioning fingers 28, adapted to engage respectively in two positioning apertures 29 provided in the plate 14; this arrangement procures a horizontal and vertical positioning of the plate 14.

To fasten the plate 14 to the panel 6, there are provided on the panel three projecting bearings, one bearing 30 situated approximately between the positioning fingers 28 and two other bearings 31 situated at the upper part of the panel. The bearings 30 and 31 define a supporting plane for the plate 14, the latter being held in supporting position under the action of magnetic means. These means are constituted advantageously by a permanent magnet 32 borne by the panel 6 and by a steel plate or another magnet (not shown) carried opposite by the plate 14. The magnetic means are preferably arranged inside the triangle bounded by the three bearings 30 and 31.

By these means, the plate 4 can be detached from the panel 6 or placed in position on the latter very simply and rapidly, without any particular tooling and hence without complex manipulations. The plate 14 bearing the heating elements then constitutes an interchangeable easily removable member, and of which the electrical connection with the rest of the machine is effected by simple plugging in due to the configuration as an electrical connector given to one of its sides.

As is self-evident and as results already besides from the foregoing, the invention is in no way limited to those of its types of application and embodiments which have been more especially envisaged; it encompasses, on the contrary, all modifications.

In particular, it will be noted that the number of contacts to be provided at the level of the connecting part 11 may be very variable according to the embodiment resorted to. If the control means of the heating elements are in the form of a large unit (which case occurs, for example, if they are constructed by means of discreet components), this unit must be housed outside of the writing head and the number of contacts to be provided on the connecting part 11 corresponds at least to the number of heating elements. On the other hand, if the unit concerned is constructed in the form of a single integrated circuit, as is made possible by current technology, this integrated circuit, of relatively small bulk, can be housed on the support 13 of heating elements itself and the number of contacts to be provided on the connecting part does not correspond to more than to the number of control connections of the integrated circuit, which are much less numerous than the heating elements. As a result a very great simplicity of construction of the flexible tapes bearing the printed circuits and a greater safety at the level of the connections, results therefrom.

We claim:

1. Writing device with heating elements for printing by thermal action on a writing support, this device being fixed to a base such as a carriage of a printing machine, said device comprising:

a support for the heating elements bearing, on the one hand, the heating elements arranged in the form of electrical resistors and, on the other hand, first electrical contacts connected electrically to said heating elements, an intermediate support mounted on said base and adapted to removably support mechanically the heating elements support, a connecting part provided with second electrical contacts arranged to cooperate with abovesaid first electrical contacts of the heating elements support and attached respectively to the base, fastening means to fix the intermediate support and the connecting part to the base , means for positioning the heating elements support on the intermediate support arranged so that the heating elements occupy, in operating position, a position pre-determined with respect to the writing support and the first and second electrical contacts respectively of the heating elements support and the connecting part cooperate mutually, and locking means to make fast mechanically and removably the heating elements support to the intermediate support, wherein the fastening means comprise a fixed rotary axle borne by the base and to which are hinged the intermediate support and the connecting part, control means being interposed between the base and the intermediate support to position the intermediate support angularly in a manner suitable for the progress of the writing process.

2. Device according to claim 1, wherein the heating elements support comprises a base plate and a strip made of a ceramic material provided with said heating elements and made fast to the base plate in the vicinity of a first edge of the latter, wherein the heating elements are constituted in the form of printed circuit elements on the strip, the abovesaid first electrical contacts and the connections between the latter and the heating elements are printed circuits on a flexible tape, and wherein said tape is fixed to the base plate to extend between said strip and a second edge of the plate opposite said first edge.

3. Device according to claim 1, wherein the intermediate support is constituted in the form of a panel equipped with the aforesaid positioning means and locking means.

4. Device according to claim 3, wherein the positioning means comprise, on the one hand, a slot provided in the connecting part and adapted to receive said support for the heating elements and, on the other hand, at least two corresponding holes formed in the base plate.

5. Device according to claim 4, wherein the positioning means comprise in addition at least one positioning bearing provided on the panel, against which the support for the heating elements is held supported under the action of the locking means.

6. Device according to claim 4, wherein the connecting part has, in transverse section, a substantially U-shape and the second electrical contacts are constituted in the form of printed circuits on at least one flexible tape whose end is engaged inside the U.

7. Device according to claim 6, wherein an elastically deformable gripping member is interposed between the cooperating surfaces of the support for the heating elements and the connecting part, respectively.

8. Device according to claim 7, wherein the elastic member is borne by the inner surface of one arm of the U formed by the connecting part and said elastic member is interposed between the arm of the U and the second flexible tape.

9. Device according to claim 6, wherein the second electrical contacts are printed on two flexible tapes supported respectively by the two arms of the U formed by the connecting part and the first electrical contacts are disposed onto two opposite faces of the support for the heating elements so as to be situated facing two second flexible tapes, in the mounting position of the support in the connecting part.

10. Device according to claim 6, wherein the bottom of the connecting part is recessed in the central axial zone of this part and the one or more second flexible tapes are engaged through this recess.

11. Device according to claim 1, wherein the locking means comprise at least one permanent magnet system interposed between the heating elements support and the intermediate support.

12. Device according to claim 1, wherein the means for controlling the angular position of the intermediate support comprise eccentric means drivable in rotation and borne by the base, and a connecting rod connecting these means eccentrically to the intermediate support, particularly to the panel.

* * * * *